United States Patent [19]

Grimsrud et al.

[11] Patent Number: 6,023,713

[45] Date of Patent: *Feb. 8, 2000

[54] OPTIMIZED CD/DVD AUTHORING EMPLOYING BLOCK REALLOCATION

[75] Inventors: Knut S. Grimsrud, Aloha; Richard L. Coulson, Portland, both of Oreg.

[73] Assignee: Intel Corporation, Santa Clara, Calif.

[ * ] Notice: This patent is subject to a terminal disclaimer.

[21] Appl. No.: 09/002,895

[22] Filed: Jan. 5, 1998

Related U.S. Application Data

[63] Continuation-in-part of application No. 08/885,325, Jun. 30, 1997, which is a continuation-in-part of application No. 08/708,983, Sep. 6, 1996, Pat. No. 5,802,593, and a continuation-in-part of application No. 08/721,826, Sep. 27, 1996, Pat. No. 5,890,205, and a continuation-in-part of application No. 08/822,640, Mar. 21, 1997, Pat. No. 5,920,896.

[51] Int. Cl.[7] ................................................ G06F 17/30
[52] U.S. Cl. ...................... 707/205; 707/203; 711/112; 711/165
[58] Field of Search ..................... 711/112, 165, 711/114; 395/821, 750.03; 364/514; 707/205, 200, 201; 348/419

[56] References Cited

U.S. PATENT DOCUMENTS

| 5,612,900 | 3/1997 | Azadegan et al. | 364/514 |
| 5,719,632 | 2/1998 | Hoang et al. | 348/419 |
| 5,809,516 | 9/1998 | Ukai et al. | 711/114 |
| 5,884,093 | 3/1999 | Berenguel et al. | 395/821 |
| 5,890,205 | 3/1999 | Grimsrud et al. | 711/112 |

*Primary Examiner*—Wayne Amsbury
*Assistant Examiner*—Thuy Pardo
*Attorney, Agent, or Firm*—Blakely, Sokoloff, Taylor & Zafman LLP

[57] ABSTRACT

An optimized CD/DVD authoring method is disclosed. Either a pre-final version of a CD/DVD having a first block allocation or a disk image of the pre-final version of the CD/DVD with the first block allocation is first created. An alternate block allocation to the first block allocation that yields improved overall access time for the content of the CD/DVD is generated, if possible, based on the order a selected subset or the entire content of the CD/DVD is accessed. A final version of the CD/DVD is then generated using the alternate block allocation.

30 Claims, 17 Drawing Sheets

| ACCESS | OPERATION | OFFSET INTO FILE | SIZE | FILE ID |
|--------|-----------|------------------|------|---------|
| 0 | READ/WRITE/OPEN | $P_0$ | $b_0$ | |
| 1 | " | $P_1$ | $b_1$ | |
| ⋮ | " | " | " | |

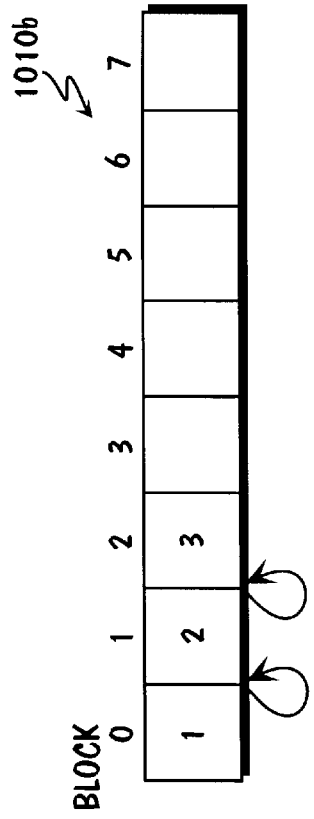
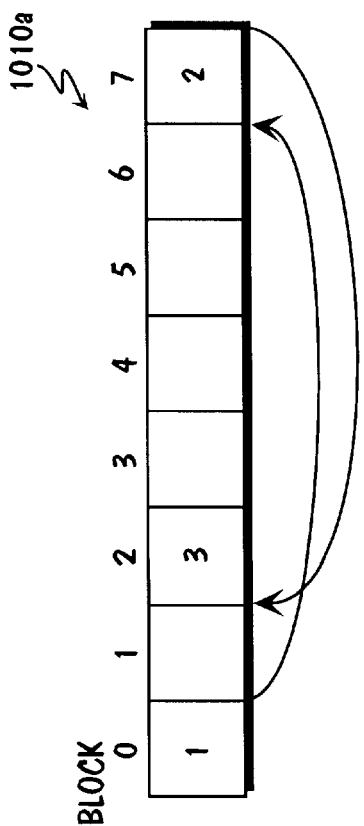
FIG. 18

OPTIMIZED CD/DVD AUTHORING EMPLOYING BLOCK REALLOCATION

RELATED APPLICATIONS

This application is a continuation-in-part application to U.S. patent application, Ser. No. 08/885,325, entitled Disk Block Allocation Optimization Methodology and Applications, filed on Jun. 30, 1997 now pending, which is a continuation-in-part application to the following U.S. Patent Applications:

(a) Ser. No. 08/708,983, entitled Method and Apparatus For Improving Disk Drive Performance, filed on Sep. 6, 1996 now U.S. Pat. No. 5,802,593;

(b) Ser. No. 08/721,826, also entitled Method and Apparatus For Improving Disk Drive Performance, filed on Sep. 27, 1996 now U.S. Pat. No. 5,890,205; and (c) Ser. No. 08/822,640, entitled Reducing Operating System Start Up/Boot Time Through Disk Block Relocation, filed on Mar. 21, 1997 now U.S. Pat. No. 5,920,896.

BACKGROUND OF THE INVENTION

1. Field of the Invention

The present invention relates to the field of computer systems. More specifically, the present invention relates to CD/DVD authoring optimization.

2. Background Information

In the art of computer systems, many problems involve optimizing data block allocations. For example, in the past decade, performance of microprocessor based computer systems have increased dramatically. In particular, the operating speed of microprocessors have increased from the meager 16 MHz to well over 200 MHz. This trend is expected to continue without abatement. Correspondingly, while not as dramatic, performance of system and input/output (I/O) buses have also improved substantially, ensuring the microprocessors have adequate data to work with and kept busy. However, except for the improvement provided by buffering etc., the performance of disk drives and CDROM (compact disk read-only-memory) drives have lagged behind. Relative to microprocessor performance, the emerging DVD (digital video disk or digital versatile disk) drives are not expected to fair much better either. As a result, users are often deprived of the full benefit of the increased performance by the microprocessors. Thus, further improvement in disk/CDROM/DVD drive performance is desirable, and as will be disclosed in more detail below, the present invention provides the desired improvement in disk/CDROM/DVD drive performance as well as other desirable results, which will be readily apparent to those skilled in the art, upon reading the detailed description to follow.

SUMMARY OF THE INVENTION

An optimized CD/DVD authoring method is disclosed. Either a pre-final version of a CD/DVD having a first block allocation or a disk image of the pre-final version of the CD/DVD with the first block allocation is first created. An alternate block allocation to the first block allocation that yields improved overall access time for the content of the CD/DVD is generated, if possible, based on the order a selected subset or the entire content of the CD/DVD is accessed. A final version of the CD/DVD is then generated using the alternate block allocation.

BRIEF DESCRIPTION OF DRAWINGS

The present invention will be described by way of exemplary embodiments, but not limitations, illustrated in the accompanying drawings in which like references denote similar elements, and in which:

FIG. 18 is a simplified illustration of the concept of block reallocation.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
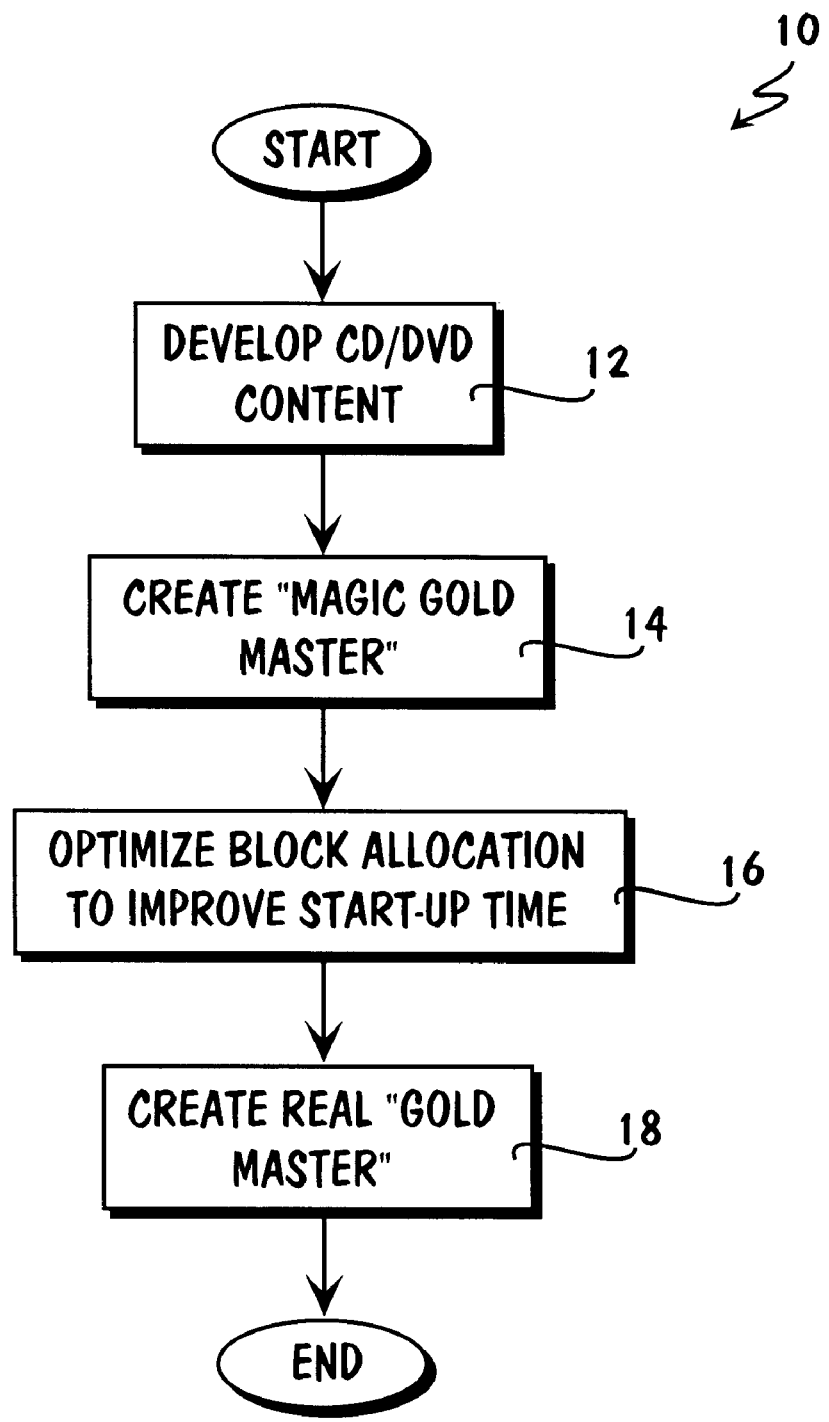
FIG. 1 illustrates one embodiment of the present invention.

Referring now to FIG. 1, wherein one embodiment of the optimized CD/DVD authoring method of the present invention is illustrated. At step 12, the CD/DVD contents is developed. At step 14, a pre-final version of the CD/DVD master (also known as a "mock" gold master) having a first block allocation is created. In an alternate embodiment, a disk image of the pre-final version of the CD/DVD master having the first block allocation is created instead. At step 16, an alternate block allocation that yields improved overall access time for the content of the CD/DVD is generated, if possible, based on the order a selected subset or the entire content the CD/DVD is accessed. At step 18, the CD/DVD master (also known as the gold master) is created using the improved alternate block allocation. Accordingly, when a user uses a CD/DVD manufactured based on the CD/DVD master, the user will perceive performance improvement. Examples of CD/DVDs that can benefit if authored in accordance with the present invention includes but not limited to games, distribution medium etc., as accesses to contents of these CD/DVD are typically deterministic.

Skipping now to FIG. 18, wherein a simplified illustration of the concept of block reallocation optimization is shown. Illustrated on the top half of the figure are two simplified block representations 1010a and 1010b of a disk drive having eight blocks, block 0 through block 7. Denoted therein inside the blocks accessed by the three accesses of a simple sequence of disk accesses are the access identifiers, access 1, access 2 and access 3. The access pattern denoted in simplified block representation 1010a illustrates the manner in which the three accesses are made, under an hypothetical disk block allocation, without optimization in accordance with the present invention, whereas the access pattern denoted in simplified block representation 1010b illustrates the manner in which the same three accesses are made, under an alternate optimized disk block reallocation, wherein the data previously stored in block 7 has been moved to block 1, in accordance with the present invention.

Illustrated in the bottom half of the figure are illustrative estimates of the access times (in milli-seconds) for the three accesses under the unoptimized and optimized block allocations. As shown, the read times are substantially the same for all accesses under either allocation, however, under the optimized block allocation, significant amount of time savings will be achieved for seek and rotation times, as the block displacement between the successive accesses are much smaller, as compared to the unoptimized block allocation. In other words, by reallocating blocks, if it can be done, significant performance improvement may be achieved for a sequence of accesses.

The above simplified illustration is merely provided for ease of understanding. The problem addressed by the present invention is many times more complex than the simplified illustration. The lengths of the access sequences that are of interest are typically significantly longer. Additionally, many blocks are accessed multiple times in one sequence, and the multiple accesses are not necessarily in the same order. In other words, block x may be accessed n times in a sequence of interest, the first time after accessing block y, the second time after accessing block z, and so forth. Furthermore, not all blocks are available for reallocation. Thus, the optimized block reallocation is seldom as simple as reallocating the blocks into a group of contiguous blocks, as illustrated by block representation 1010b.

Figure 2:
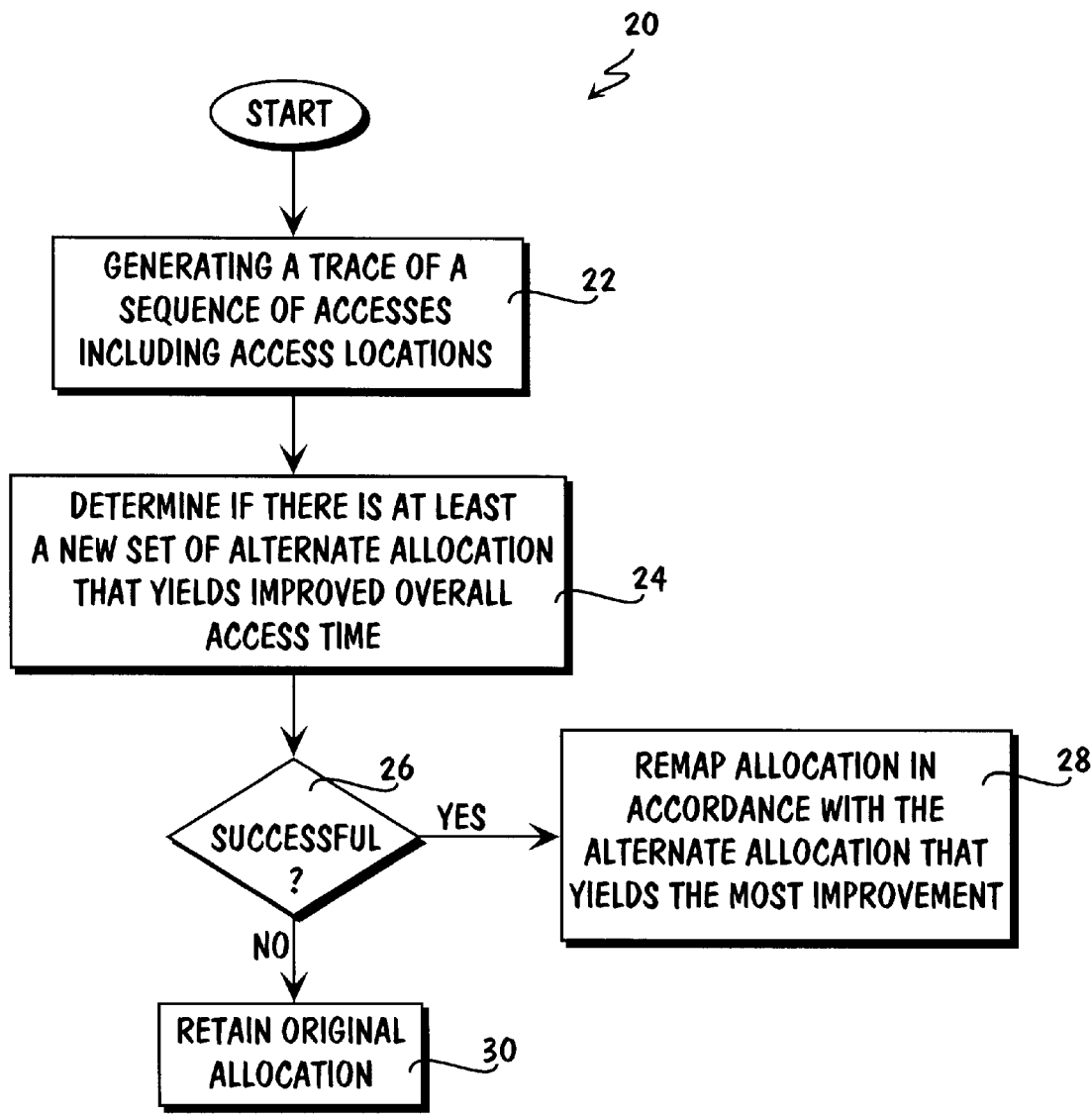
FIG. 2 illustrates the optimization step in further detail.

Returning now to FIG. 2, wherein one embodiment of the optimization step of FIG. 1 (step 16) is illustrated. As shown, for the illustrated embodiment, a trace is first generated for a selected subset or the entire content of the CD/DVD of interest, step 22. The trace includes either the locations of blocks accessed or information that can be used to determine the locations of blocks accessed. Next, one or more attempts are made to generate an alternate block allocation that will yield improved overall access time, as determined by a cost function, step 24. An example of a simple cost function, for illustrative purposes, is $T = d \times c_1 + c_2 + c_3$, where T is access time, d is seek distance, $c_1$ is seek time per unit of seek distance, $c_2$ is rotation time, and $c_3$ is read time. If at least one of the attempts is successful, the data are remapped into the alternate block allocation that yields the most improvement in overall access time, step 28. Otherwise, the original block allocation is retained, step 30.

Figure 3:
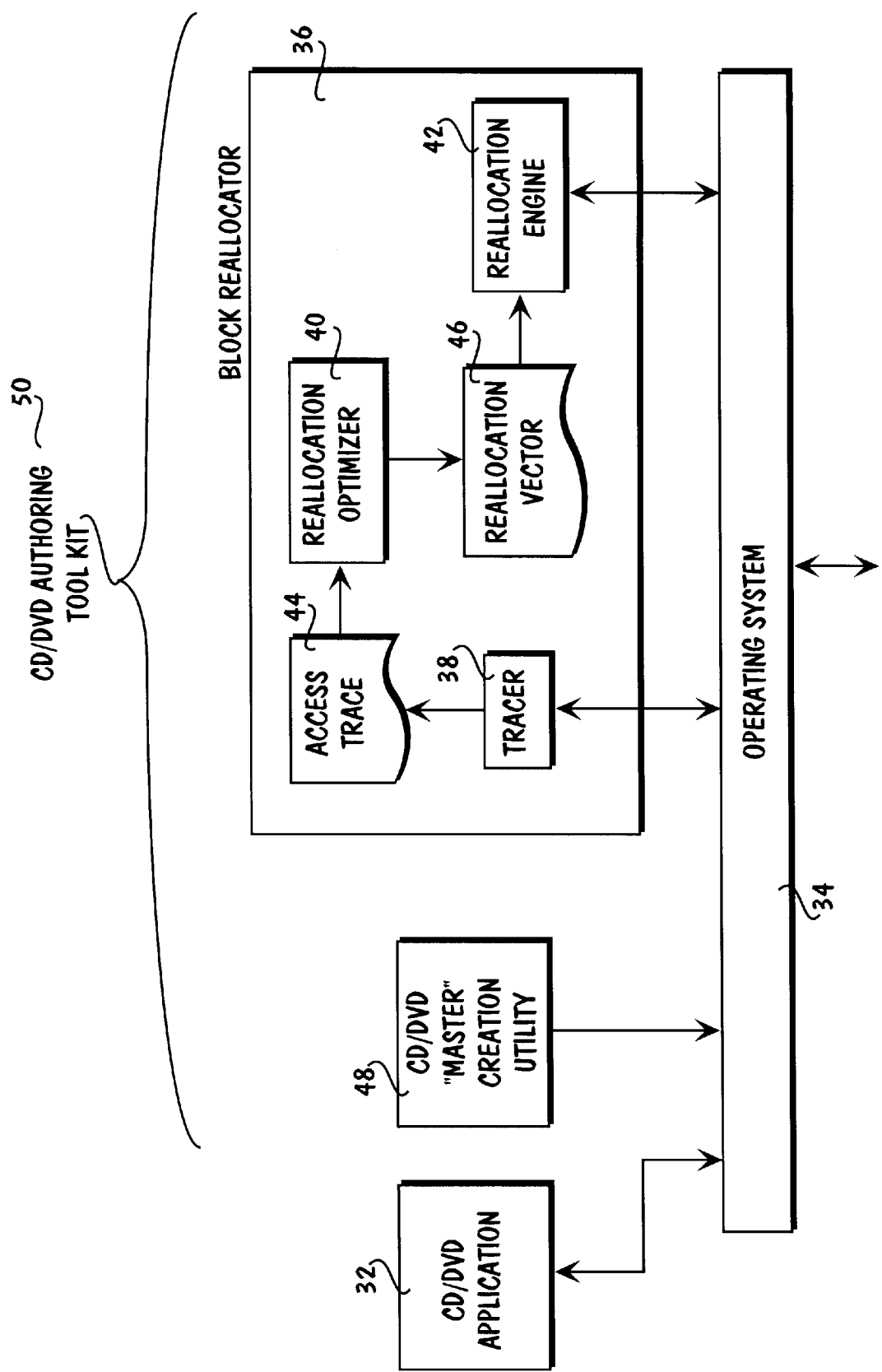
FIG. 3 illustrates one embodiment of a CD/DVD authoring tool incorporated with the teachings of the present invention.

FIG. 3 illustrates one embodiment of a CD/DVD authoring tool incorporated with the teachings of the present invention. In FIG. 3, the block allocation optimization technique of the present invention is embodied in a block reallocator 36 of a CD/DVD authoring toolkit 50, which also includes "master" creation utility 48. Also shown in FIG. 3 is an executing copy of the CD/DVD application 50 read off the CD/DVD master or a CD/DVD produced using the CD/DVD master.

In one embodiment, in addition to being equipped to create a CD/DVD master, "master" creation utility 48 is also equipped to create a disk image of a pre-final version of a CD/DVD master. Block reallocator 36 includes tracer 38, reallocation optimizer 40 and reallocation engine 42. Tracer 38 traces the accesses made by CD/DVD application 32, which may include a selected subset or the entire content of the CD/DVD of interest. In one embodiment, tracer 38 first traces file accesses made by CD/DVD application 32, which are subsequently mapped to physical blocks accessed by reallocation optimizer 40. In an alternate embodiment, tracer 38 traces the physical blocks accessed directly. For the illustrated embodiment, operating system 34 provides I/O read/write services for accessing the CD/DVD drives, and CD/DVD application 32 utilizes these I/O read/write services when accessing file data stored on the CD/DVD drives. Furthermore, operating system 34 provides event notification services, and tracer 38 leverages on these services to directly or indirectly trace accesses performed by CD/DVD application 32. Tracer 38 logs the physical trace results in access trace 44.

Reallocation optimizer 40 is used to generate, if possible, an alternate block allocation that will yield improved overall access time for the CD/DVD, using the trace results logged in access trace 44. If successful, reallocation optimizer 40 generates reallocation vector 46 setting forth the manner in which the blocks should be reallocated. Reallocation engine 42 is then used to effectuate the reallocation as stipulated by reallocation vector 46.

Figure 4A:
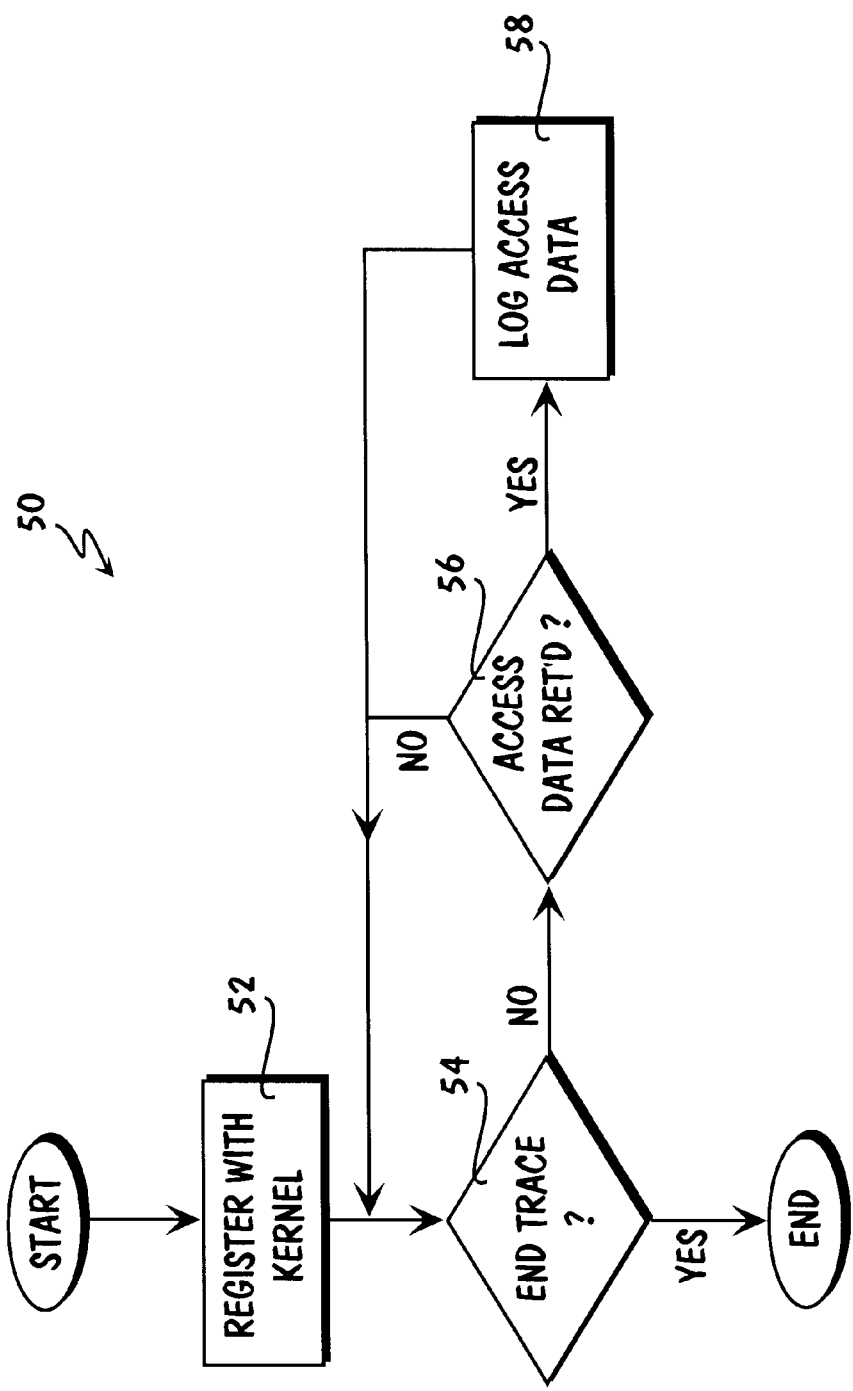
FIGS. 4a–4c illustrate one embodiment of the operational flow of the tracer, with the tracer traces file accesses, and subsequently maps the traced accesses to physical disk blocks.
Figures 4B, 4C:
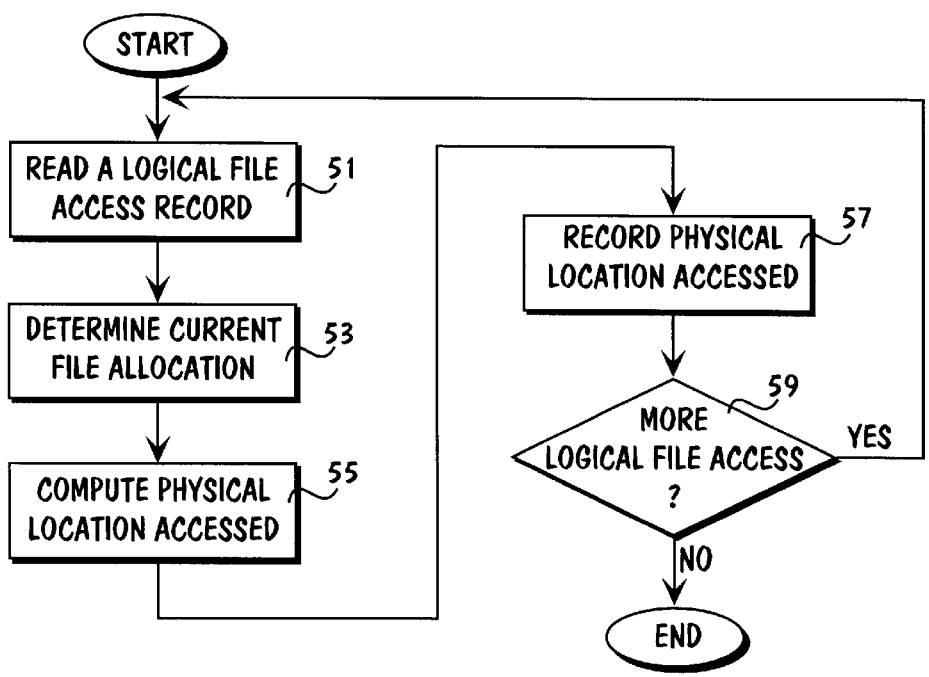

FIGS. 4a–4c illustrate one embodiment of tracer 38, where tracer 38 first traces file accesses, which are subsequently mapped to physical blocks by reallocation optimizer 40. As shown in FIG. 4a, for the illustrated embodiment, upon invocation, tracer 38 registers itself with operating system 34, denoting its interest in file/block accesses, in particular, the logical/physical locations accessed, step 52. Upon registering itself, tracer 38 waits for the requested information to be returned from operating system 34, and logs the access data as they are returned, as long as the trace period has not elapsed, steps 54–58. Tracer 38 may be encoded or dynamically provided with the length of the trace period.

FIG. 4b illustrates one embodiment of a logical access trace 43. As shown, for the illustrated embodiment, logical access trace 43 includes a number of file access records 61. Each access record 61 includes an access identifier 63 identifying the access sequence number, a file identifier 71 identifying the file accessed, the file access operation performed 65, e.g. read, write or open, an offset into the file accessed 67, and the size of the data accessed 69, e.g. the number of bytes.

FIG. 4c illustrates one embodiment of the mapping operational flow of reallocation optimizer 40. As shown, for the illustrated embodiment, the mapping process starts at step 51, where tracer 38 retrieves a logical file access record 61. Next, based on the file identification information 71, reallocation optimizer 40 determines the blocks allocated to the file accessed, step 53. Then, based on access offset and size information 67 and 69, reallocation optimizer 40 computes the specific blocks accessed, step 55. Once computed, reallocation optimizer 40 records the physical block information for subsequent use, step 57. The physical block information may be recorded or maintained in any one of a number data structures known in the art. Reallocation optimizer 40 repeats the above described steps until it is determined at step 59 that all logical file access records have been processed.

Either the direct or the indirect tracing approach described above, with or without pruning (reduction), may be employed to practice the present invention. The direct approach has the advantage of being simpler to implement, however tracing is re-performed each time optimization is to be performed, even though it is for the same access interest. On the other hand, the indirect approach involves additional complexity, however it has the advantage of just having to re-perform the mapping operation (without re-tracing), whenever optimization is re-performed for the same access interest.

Figure 5:
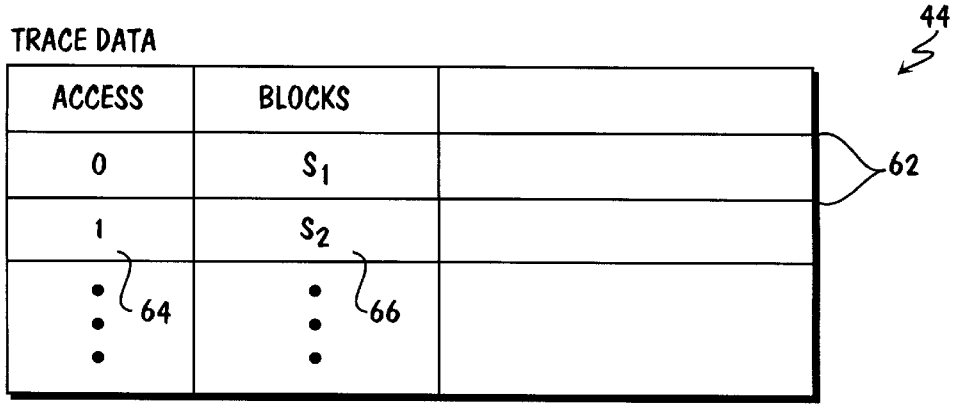
FIG. 5 illustrates one embodiment of the physical trace log.

FIG. 5 illustrates one embodiment of a data structure for maintaining the mapped physical block information. As shown, for the illustrated embodiment, the data structure includes a number of physical access records 62. Each physical access record 62 includes an access identifier 64 identifying the access sequence number, and the blocks accessed 66.

Figure 6:
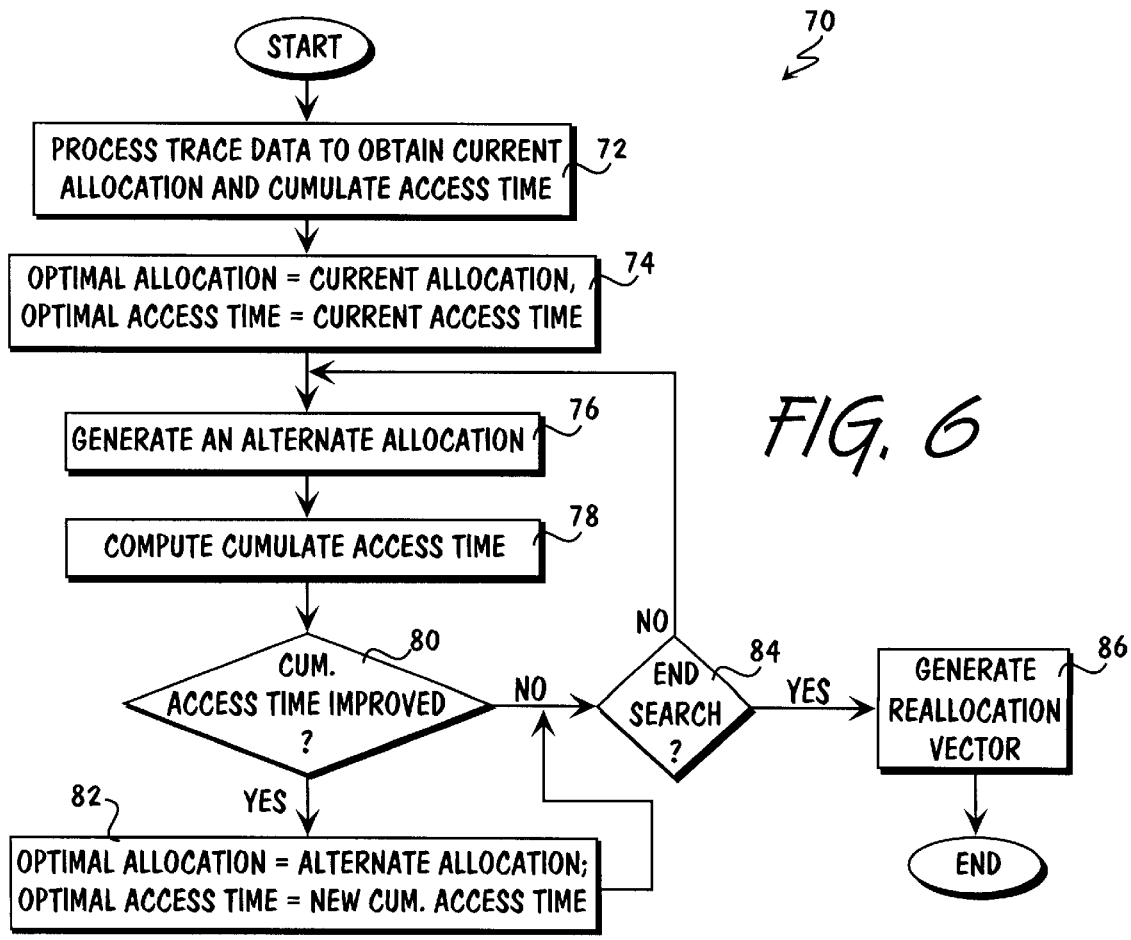
FIG. 6 illustrates one embodiment of the operational flow of the reallocation optimizer for generating an alternate disk block allocation.

Referring now to FIG. 6, wherein one embodiment of the operational flow of reallocation optimizer 40 is illustrated. As shown, for the illustrated embodiment, upon invocation, reallocation optimizer 40 processes the physical data blocks, and generates the cumulative access time for the current block allocation, step 72. Next, reallocation optimizer 40 notes that current block allocation as the optimal disk block allocation, and the current estimated cumulative access time as the optimal cumulative access time, step 74. [Note that as with all optimization techniques, the optimal access time referred herein is optimal only in the sense within the context and precision of the present optimization technique, and is not necessarily the absolute best result that can be achieved.]

Having done so, reallocation optimizer 40 generates an alternate block allocation with randomized incremental changes, step 76. Randomized incremental changes may be synthesized in accordance with any number of such techniques known in the art. Using the generated alternate block allocation, reallocation optimizer 40 determines a new cumulative access time for the selected subset or the entire content of the CD/DVD of interest, step 78. If the generated alternate block allocation yields improved overall access time, i.e. the new cumulative access time is better than the "optimal" cumulative access time, reallocation optimizer 40 notes the generated alternate block allocation as the optimal block allocation, and the new cumulative access time as the optimal cumulative access time, step 82. Otherwise, step 82 is skipped.

Steps 76–80 and conditionally step 82 are repeated until a predetermined condition for terminating the search for alternate block allocation that yields improved overall access time has been met. A variety of termination conditions may be employed. For example, reallocation optimizer 40 may be encoded or dynamically provided with a parameter delimiting the "length" of search, in terms of total evaluation or elapsed time, number of alternate reallocation schemes evaluated, etc. At the conclusion of the search, reallocation optimizer 40 generates reallocation vector 46 denoting the reallocation to be performed, based on the optimal block allocation, step 86. For the illustrated embodiment, if the optimal block allocation was never updated, i.e. no block allocation yielding improved overall access time was found, reallocation vector 46 is a null vector.

Figure 7:
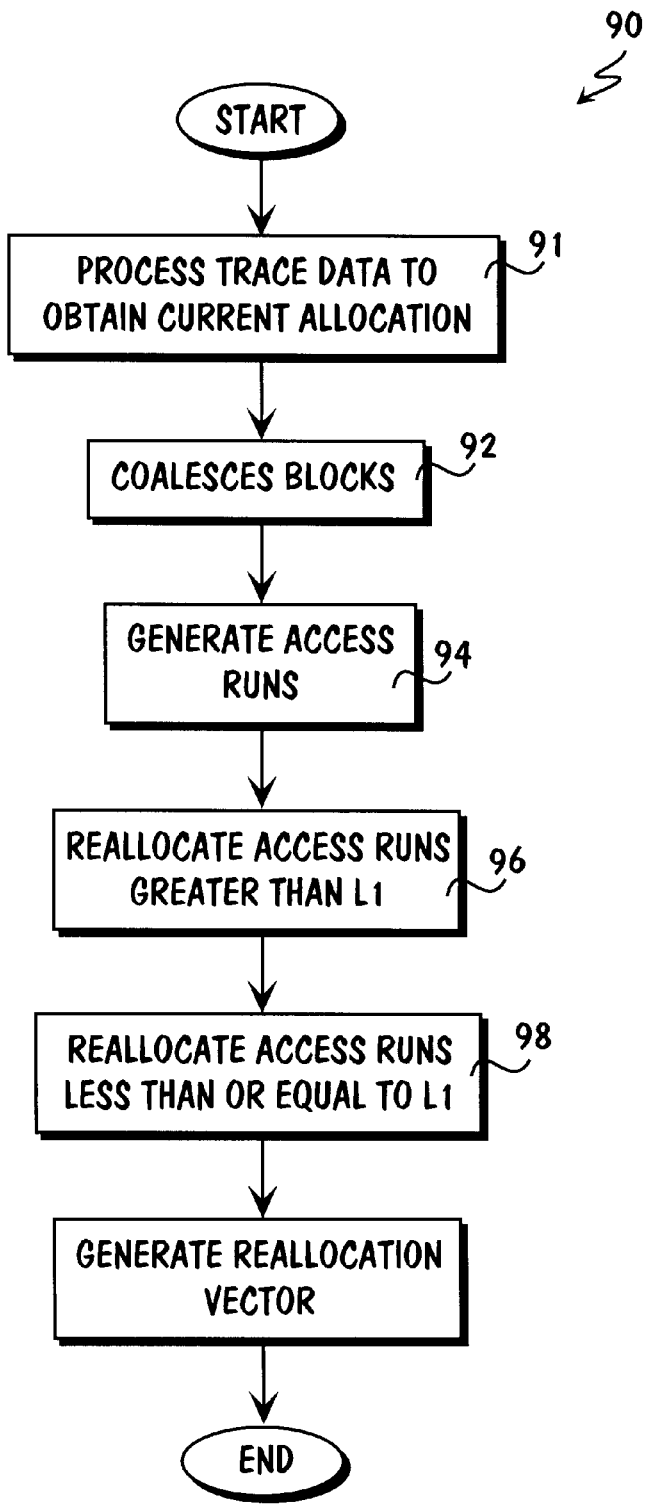
FIG. 7 illustrates an alternative embodiment of the operational flow of the reallocation optimizer for generating an alternate disk block allocation.

FIG. 7 illustrates an alternate embodiment of reallocation optimizer 40. As shown, for the illustrated embodiment, upon invocation, similar to the earlier described embodiment, reallocation optimizer 40 processes the trace data recorded in access trace 44 to obtain the current block allocation for the selected subset or the entire content of the CD/DVD of interest, i.e. the locations accessed, and in turn computes the cumulative access time for the current block allocation, step 91. Next, unlike the earlier described embodiment, reallocation optimizer 40 coalesces the blocks, step 92. Coalescing the blocks may be performed in any one of a number of known techniques. One approach will be briefly described later.

Figure 8:
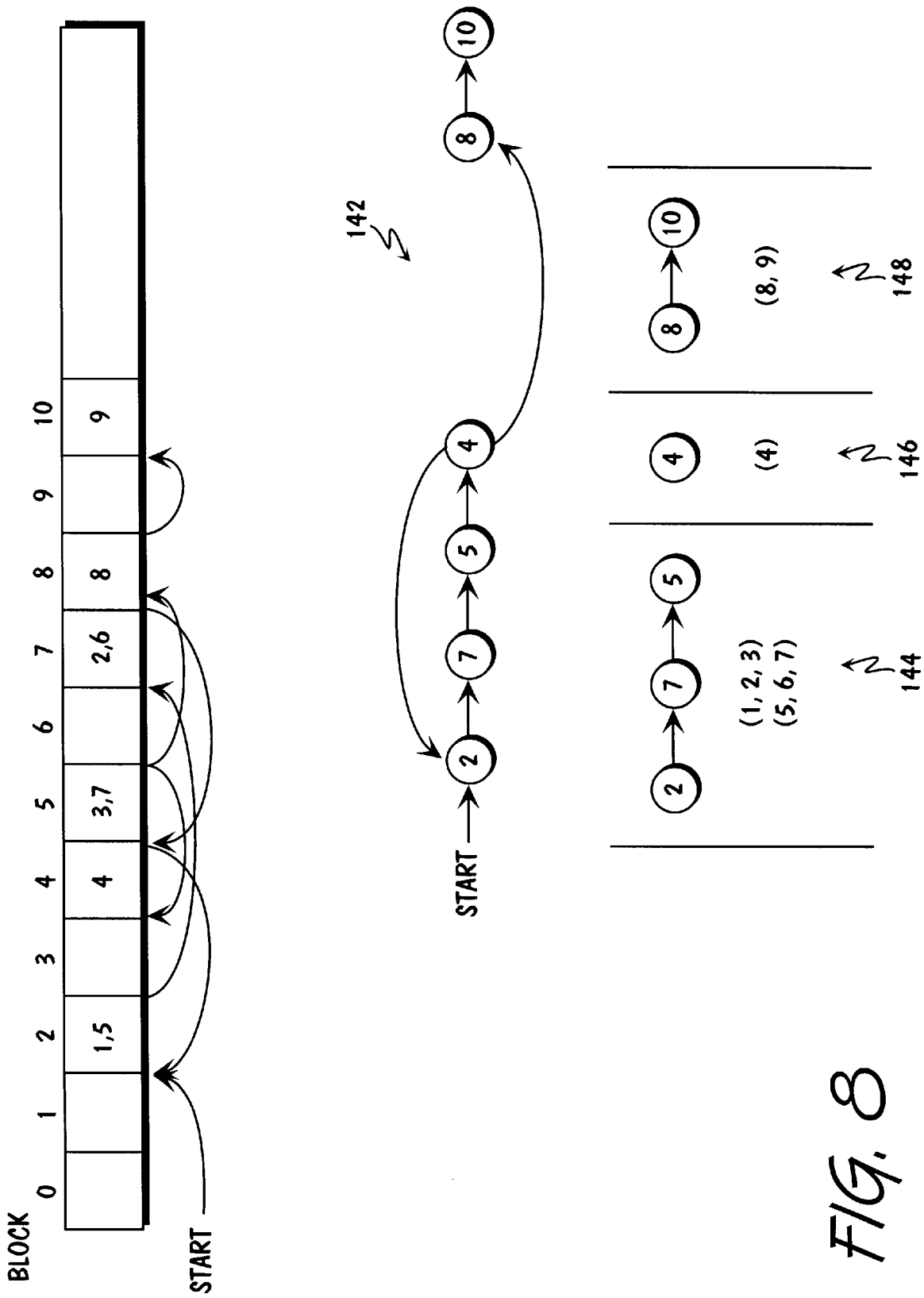
FIG. 8 illustrates in further details the concept of access run.

Having coalesced the blocks, reallocation optimizer 40 proceeds to analyze the trace data and groups the accesses into access runs, step 94. FIG. 8 illustrates the concept of access runs. Illustrated therein is a hypothetical sequence of accesses, access 1 through access 9, against the enumerated blocks in the order shown. For this hypothetical sequence of accesses, blocks 2, 7 and 5 are always accessed as a "run". These blocks are accessed in order during access 1 through access 3, and then during access 5 through access 7. Likewise, blocks 8 and 10 are also considered as a "run", except it is accessed only once. Block 4 is a "run" with a run length of one.

Return now to FIG. 7, having grouped the accesses into access runs, reallocation optimizer 40 reallocates the blocks on an access run basis. For the illustrated embodiment, the "longer" access runs are reallocated first, step 96, before the "shorter" access runs are reallocated, step 98. "Longer" access runs are access runs with run lengths greater than a predetermined run length threshold (L1), whereas "shorter" access runs are access runs with run length shorter than L1. The value of L1 is application dependent, and is empirically determined. In one embodiment, L1 is set to 64. After, both the "longer" as well as the "shorter" access runs have been reallocated, reallocation optimizer 40 generates reallocation vector 46 as the earlier described embodiment.

Figure 9:
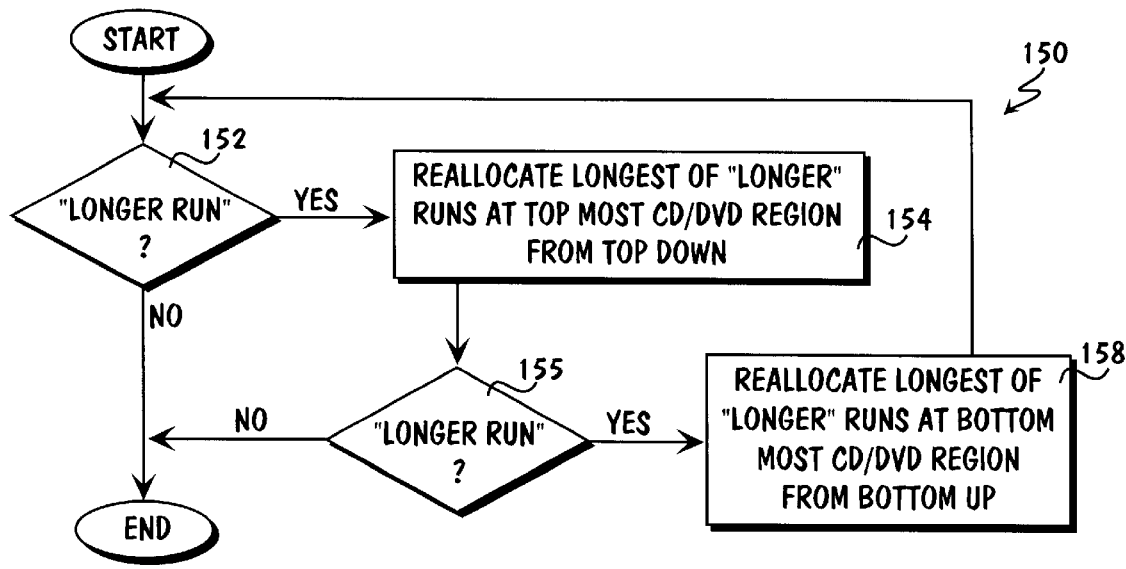
FIG. 9 illustrates in further details one embodiment of the "long access run" reallocation step.
Figure 10:
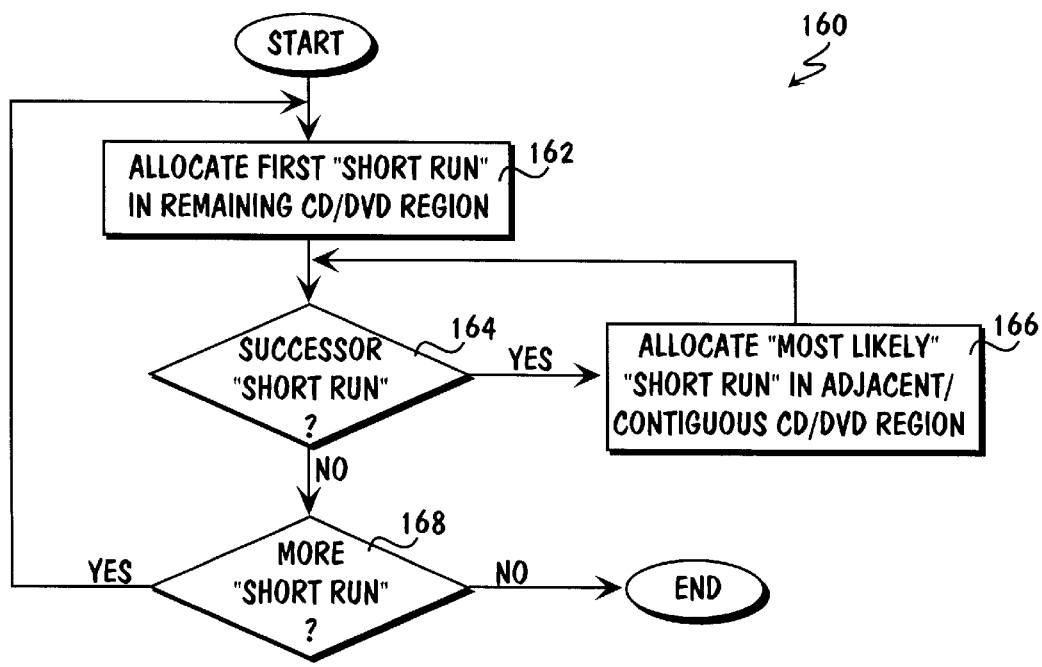
FIG. 10 illustrates in further details one embodiment of the "short access run" reallocation step.
Figure 11:
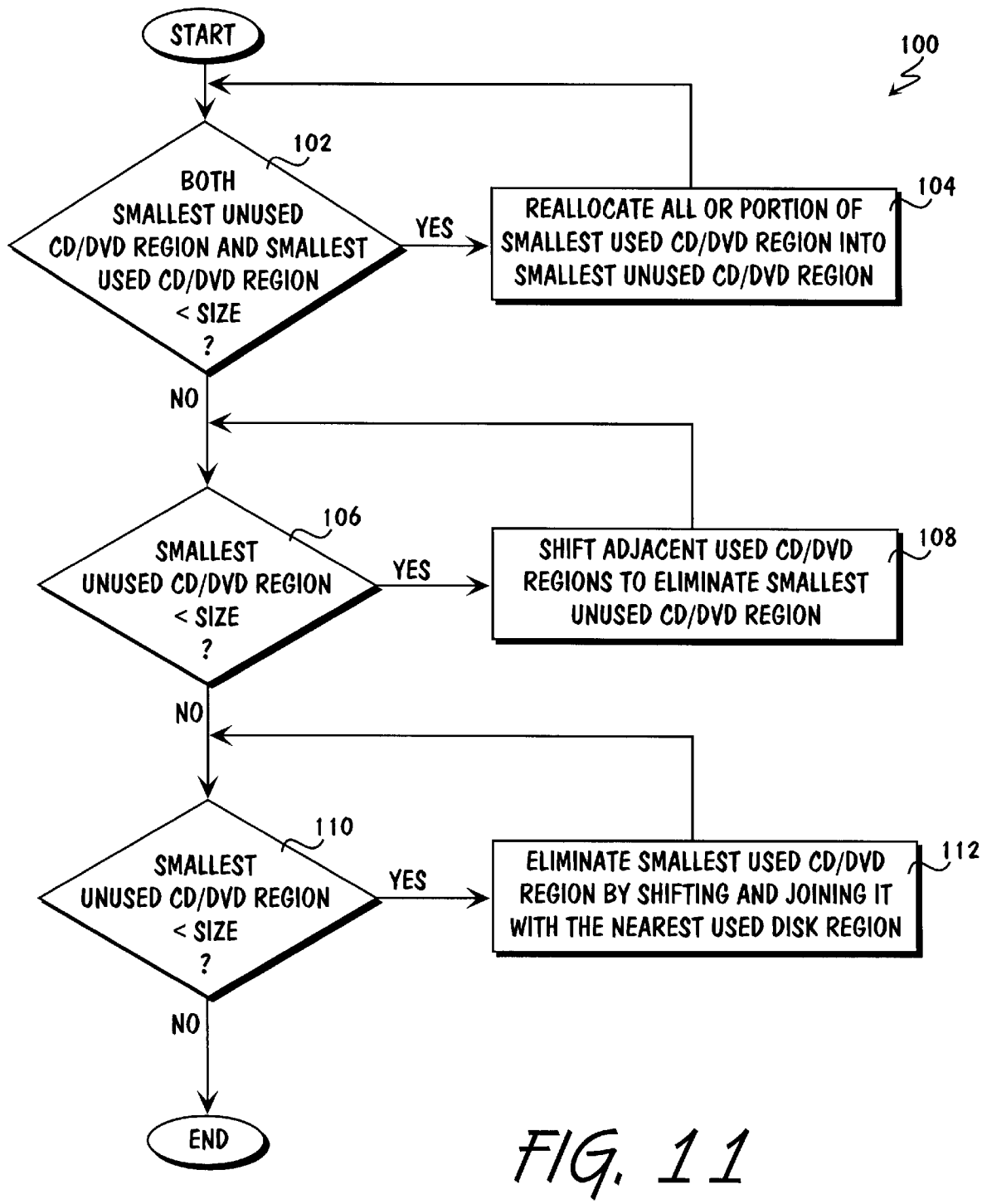
FIGS. 11–14 illustrate in further details one embodiment of the coalescing step.

FIGS. 9–10 illustrate one embodiment each for reallocating the "longer" and "shorter" access runs. As shown in FIG. 9, for the illustrated embodiment, reallocation optimizer 40 reallocates the "longer" access runs to contiguous CD/DVD regions at both ends of a CD/DVD, alternating between the two ends, until all "longer" access runs have been reallocated. At step 152, reallocation optimizer 40 determines if there are still "longer" access runs to be reallocated. If the determination is affirmative, for the illustrated embodiment, reallocation optimizer 40 reallocates the longest of the remaining "longer" run to the "top most" portion of the CD/DVD region, step 154. At step 156, reallocation optimizer 40 again determines if there are still "longer" access runs to be reallocated. If the determination is affirmative, for the illustrated embodiment, reallocation optimizer 40 reallocates the longest of the remaining "longer" run to the "bottom most" portion of the CD/DVD region, step 158. Steps 152–158 are repeated until all "longer" access runs have been reallocated. As steps 154 and 158 are repeated, the "top most" portion bound reallocations are reallocated in a "top down" manner, whereas the "bottom most" portion bound reallocation are reallocated in a "bottom up" manner. In other words, the "center" portion of the CD/DVD region is left unallocated at the end of the "longer" access run reallocation.

As shown in FIG. 10, for the illustrated embodiment, reallocation optimizer 40 reallocates the "shorter" access runs, by first arbitrarily picking one of the "shorter" access runs, step 162. Then the successor "shorter" access runs to the selected "shorter" access run are reallocated near the selected "shorter" access run based on their likelihood of occurrence, i.e. the frequency of occurrence of the successor "shorter" access run, steps 164–166. A successor access run is simply an access run that follows the selected access run. Steps 164–166 are then repeated until all successor access runs to the selected access run are reallocated. Then, the entire "shorter" access run reallocation process, i.e. steps 162–166 are repeated until all "shorter" access runs have been reallocated.

The two approaches to reallocating "longer" and "shorter" access runs are complementary to each other. Together the two approaches provide the advantage of reducing the access time of the "shorter" access runs, since they are all concentrated at the "center" portion of the CD/DVD region, and the advantage of spreading the higher cost of moving to the end portions of the CD/DVD region over a larger number of accesses, since a number of successive accesses will be made at the end portions once the actuator is moved there.

Figure 12:
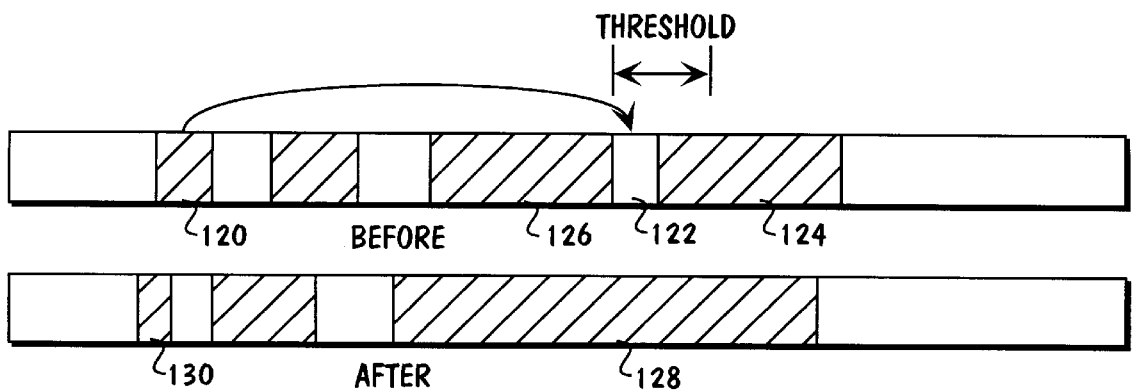

Returning now to the topic of coalescing blocks of a CD/DVD drive. FIGS. 11–14 illustrate one approach for achieving the desired coalescing of blocks. As shown, for the illustrated approach, reallocation optimizer 40 first determines if both the smallest unused CD/DVD region as well as the smallest used region are smaller than a predetermined size, step 102. [For the purpose of this application, an unused CD/DVD region is a CD/DVD region not accessed during the trace, the CD/DVD region may or may not have been allocated.] The value of the predetermined size is also application dependent, and empirically determined. In one embodiment, a value of 64 is also used for the predetermined size. If the determination is affirmative, reallocation optimizer 40 reallocates all or a portion of the smallest used CD/DVD region into the smallest unused CD/DVD region, step 104 (see also FIG. 12). Steps 102–104 are repeated until either the smallest unused CD/DVD region or the smallest used CD/DVD region is greater than or equal to the predetermined size. Together, these two steps have the effect of filling up the small "in-between" unused CD/DVD regions, and eliminate the small "in-between" used CD/DVD regions, as illustrated by FIG. 12.

Figure 13:
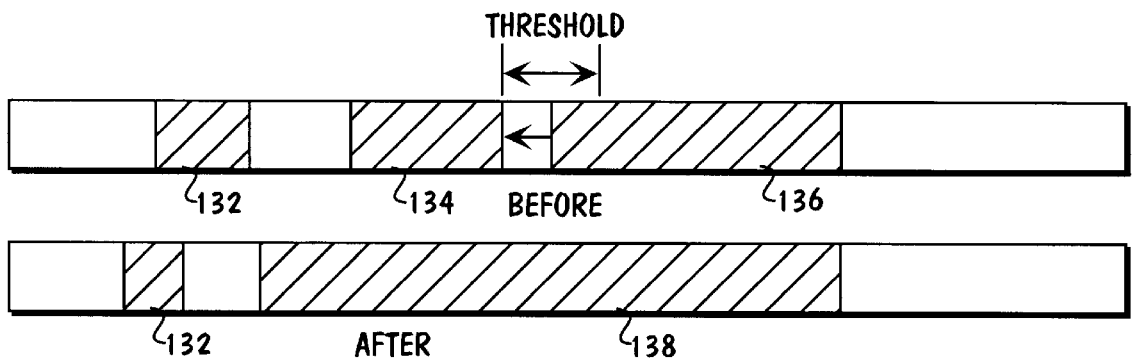

Next, for the illustrated approach, reallocation optimizer 40 determines if the smallest unused CD/DVD region is smaller than the predetermined size, step 106. If the determination is affirmative, reallocation optimizer 40 reallocates one or both of the two used CD/DVD regions bounding the smallest unused CD/DVD region, by shifting one towards the other, or both towards each other, step 108 (see also FIG. 13). Steps 106–108 are repeated until the smallest unused CD/DVD region is greater than or equal to the predetermined size. Together, these two steps have the effect of eliminating the "in-between" small unused CD/DVD regions as illustrated by FIG. 13.

Figure 14:
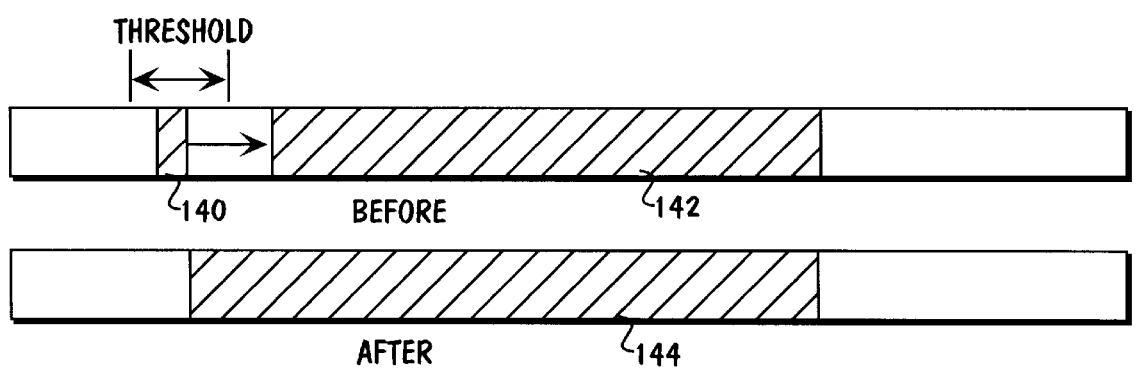

Next, for the illustrated approach, reallocation optimizer 40 determines if the smallest used CD/DVD region is smaller than the predetermined size, step 110. If the determination is affirmative, reallocation optimizer 40 reallocates the smallest used CD/DVD region, by shifting it towards the closest neighboring used CD/DVD region, step 112 (see also FIG. 14). Steps 110–112 are repeated until the smallest used CD/DVD region is greater than or equal to the predetermined size. Together, these two steps have the effect of eliminating any "in-between" used CD/DVD regions as illustrated by FIG. 14.

While at first brush, the two embodiments for generating an alternate block allocation that yields improved overall access time appear to be very different, they are really two species of a genus of approaches to practically and optimally solving the cost function of overall access time, expressed in terms of block allocation, i.e. Min. C{b1, b2, . . . , bn}, where C{} is the cost function of overall access time, and (b1, b2, . . . bn) is a set of block allocation.

Skipping now to FIGS. 16 and 17a–17d, wherein another alternate embodiment of the operational flow of reallocation optimizer 40 is shown. As illustrated, at step 252, reallocation optimizer 40 reads the physical blocks accessed, and constructs a model to represent the sequence of physical blocks accessed. For the illustrated embodiment, where the unit of allocation of the file subsystem is a file cluster, reallocation optimizer 40 creates a node in the model to represent each file cluster accessed. Additionally, reallocation optimizer 40 creates a transition arc to connect two nodes to represent a successive access relationship between the clusters represented. A weight is assigned to each transition arc to represent the probability of the transition being made. The weight (probability) is computed based on the number of occurrences of the transition observed, relative to other transitions from the node. For example, if 6 and 4 transitions from node A to nodes B and C respectively are observed, the transition arc joining nodes A and B is assigned with the weight or probability of 0.6, whereas the transition arc joining nodes A and C is assigned with the weight or probability of 0.4. Other weighting approaches may be employed. Any one of a number of data structures known may be employed to store the node and the transition arc data.

Figure 17A:
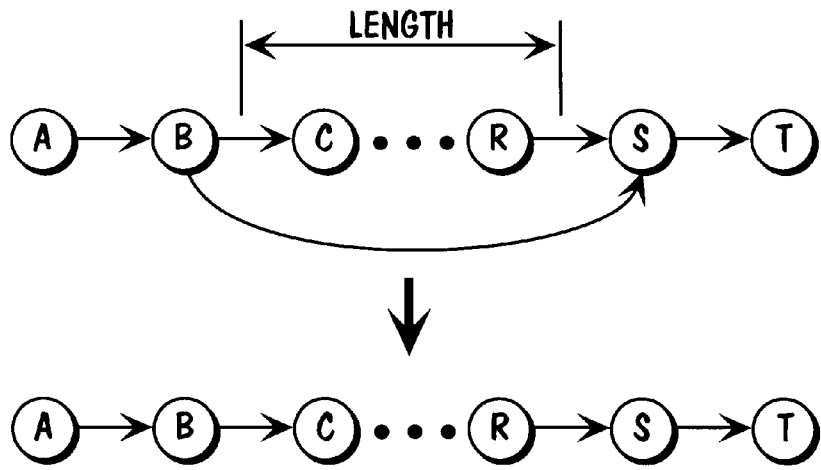
FIGS. 17a–17e illustrate a number of model pruning criteria.

At step 254, reallocation optimizer 40 traverses the model to eliminate all forward "rejoining" transition arcs with lengths, measured in terms of the number of intermediate nodes between the connected nodes, that are shorter than a first pre-determined threshold (see FIG. 17a, for ease of illustration, only one forward "rejoining" transition arc is shown). In one embodiment, the first pre-determined threshold is set to a pre-fetch size of the CD/DVD drive, which may be dynamically provided by a user prior to an optimization run, pre-configured during installation of CD/DVD authoring tool 50, or defaulted to a predetermined most likely value (e.g., the prefetch size of the most popular CD/DVD drive).

Figure 17B:
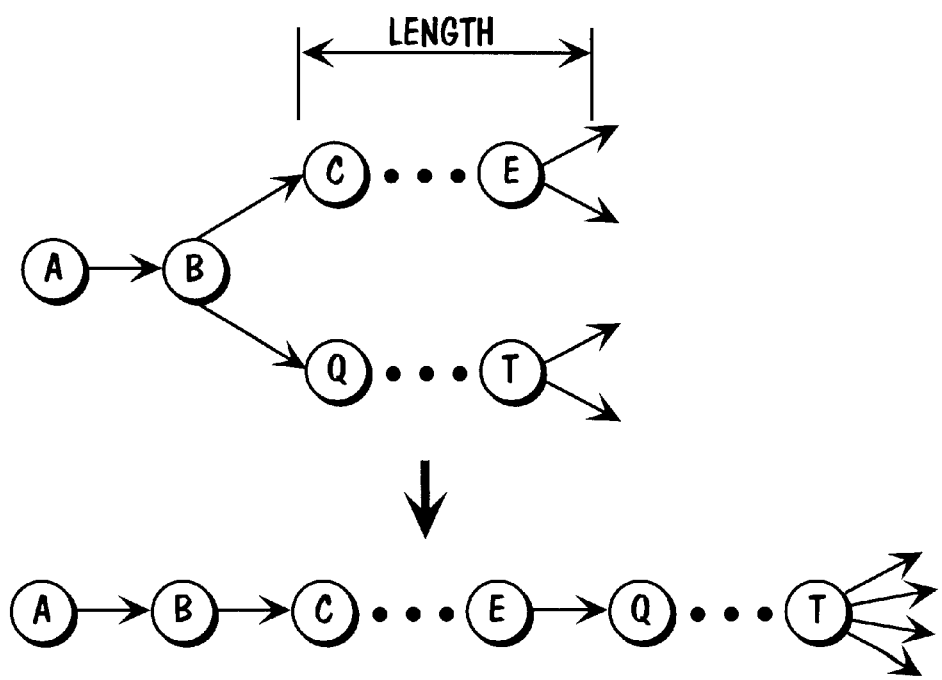

At step 256, reallocation optimizer 40 traverses the model to successively serialize parallel strings emanating from a node with lengths, measured in terms of nodes, that are shorter than a second pre-determined threshold (see FIG. 17b, for ease of illustration, only two parallel emanating strings are shown). Each of the eligible parallel strings (e.g. C . . . E) is successively serialized at the beginning of the longest parallel string (i.e. Q . . . T). The transition arcs emanating from the last node of each of the serialized strings (e.g. E of C . . . E) are added to the last node of the longest parallel string (i.e. T of Q . . . T). In one embodiment, one pre-determined threshold is employed as both the first and the second pre-determined threshold, and the common pre-determined threshold is provided in the same manner as described above.

Figure 17C:
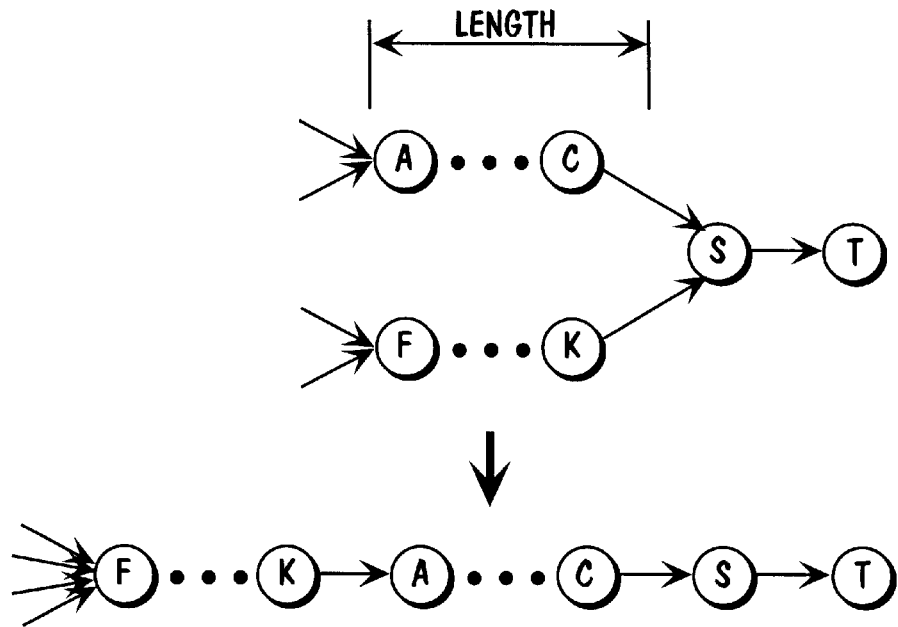

At step 258, reallocation optimizer 40 traverses the model to successively serialize parallel strings joining a node with lengths, measured in terms of nodes, that are shorter than a third pre-determined threshold (see FIG. 17c, for ease of illustration, only two parallel joining strings are shown). Each of the eligible parallel strings (e.g. A . . . C) is successively serialized at the end of the longest parallel string (i.e. F . . . K). The transition arcs joining the first node of each of the serialized strings (e.g. A of A . . . C) are added to the first node of the longest parallel string (i.e. F of F . . . K). In one embodiment, one common pre-determined threshold is employed for the first, the second as well as the third pre-determined threshold, and the common pre-determined threshold is provided in the same manner as described above.

Figure 17D:
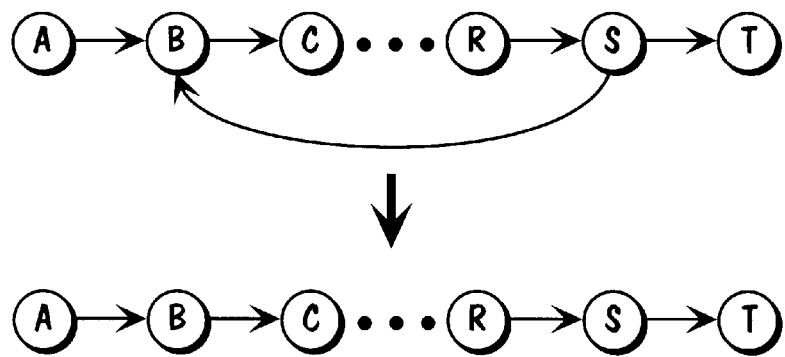
Figure 17E:
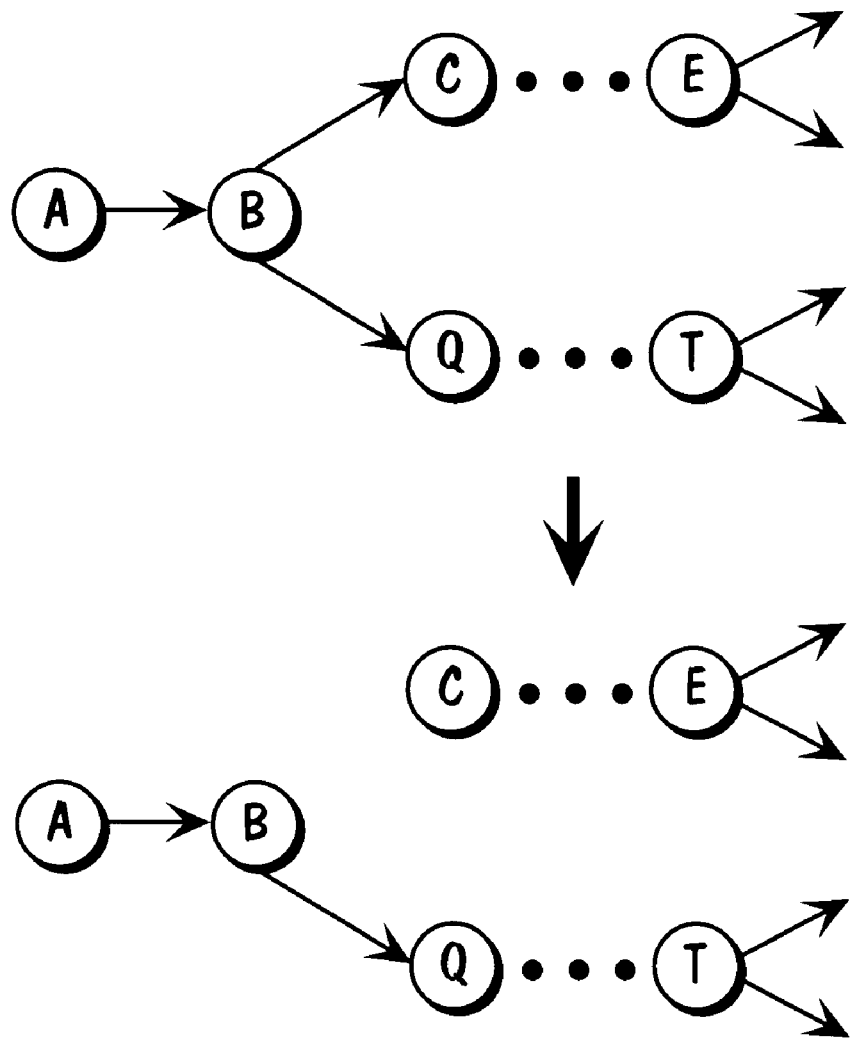

At step 260, reallocation optimizer 40 traverses the model to remove all "cycle forming" backward "rejoining" transition arcs (see FIG. 17d, for ease of illustration, only one "cycle forming" backward "rejoining" transition arc is shown). At step 262, reallocation optimizer 40 traverses the model to remove all less probable incoming transition arcs, as well as all less probably outgoing transition arcs, keeping only the most probable incoming transition arc, and if applicable, the most probable outgoing transition arc, for each node with more than one outgoing or more than one incoming transition arcs (see FIG. 17e, for ease of illustration, only the outgoing case is shown). In other words, at the end of step 262, each node has at most one incoming transition arc, and at most one outgoing transition arc.

Additionally, for the illustrated embodiment, the process loops back to step 254 from step 256, 258, 260 or 262, if a reduction was actually made when applying the pruning criteria, as the reduction may create new opportunities for previously considered pruning criteria. The process continues until all remaining nodes have at most one incoming and one outgoing arc.

In general, the pruning criteria employed in the pruning strategy is devised such that the resultant model represents the portion of the traced accesses where significant performance improvement can mostly likely be obtained, given the performance characteristics of a particular class of CD/DVD drives, and the allocation restrictions imposed by the file system as well as the order of access of the traced "workload". The pruning criteria listed here are illustrative, and a number of other pruning criteria based on the characteristics of CD/DVD drives are possible.

Returning now briefly to FIG. 3, for the illustrated embodiment, reallocation vector 46 specifies the block relocations to be performed in a conventional destination oriented manner. However, reallocation engine 36 includes a transform operation for annotating reallocation vector 46 with data source information, and equipped with a source oriented data move technique that effectuates the desired block relocations keying off the annotated data source information, as disclosed in U.S. patent application, Ser. No. 08/885,327, entitled Source Oriented Data Move Methodology and Applications, filed Jun. 30, 1997, which is hereby fully incorporated by reference.

Figure 15:
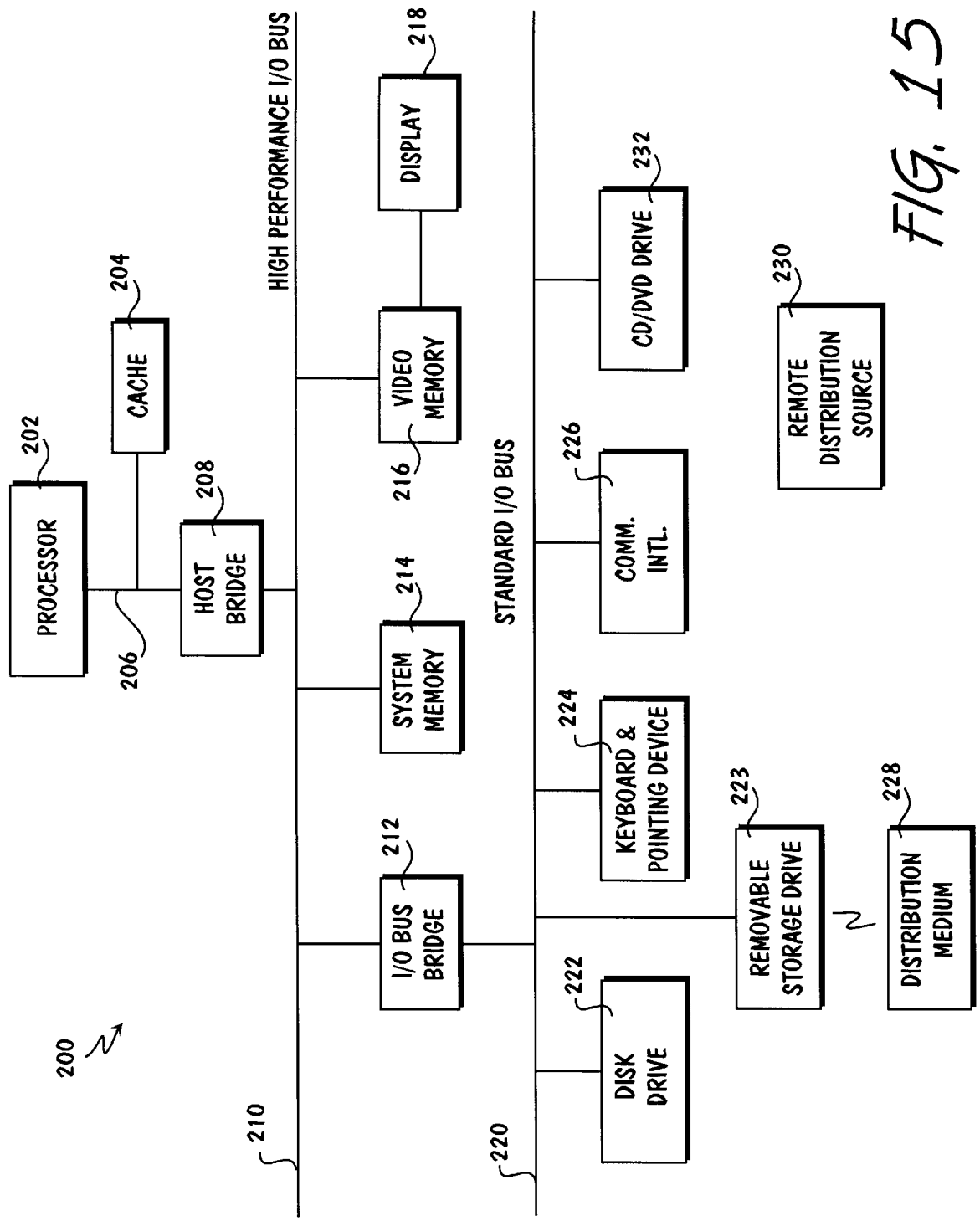
FIG. 15 illustrates one embodiment of a computer system suitable for programming with the embodiment of the present invention illustrated in FIG. 3.
Figure 16:
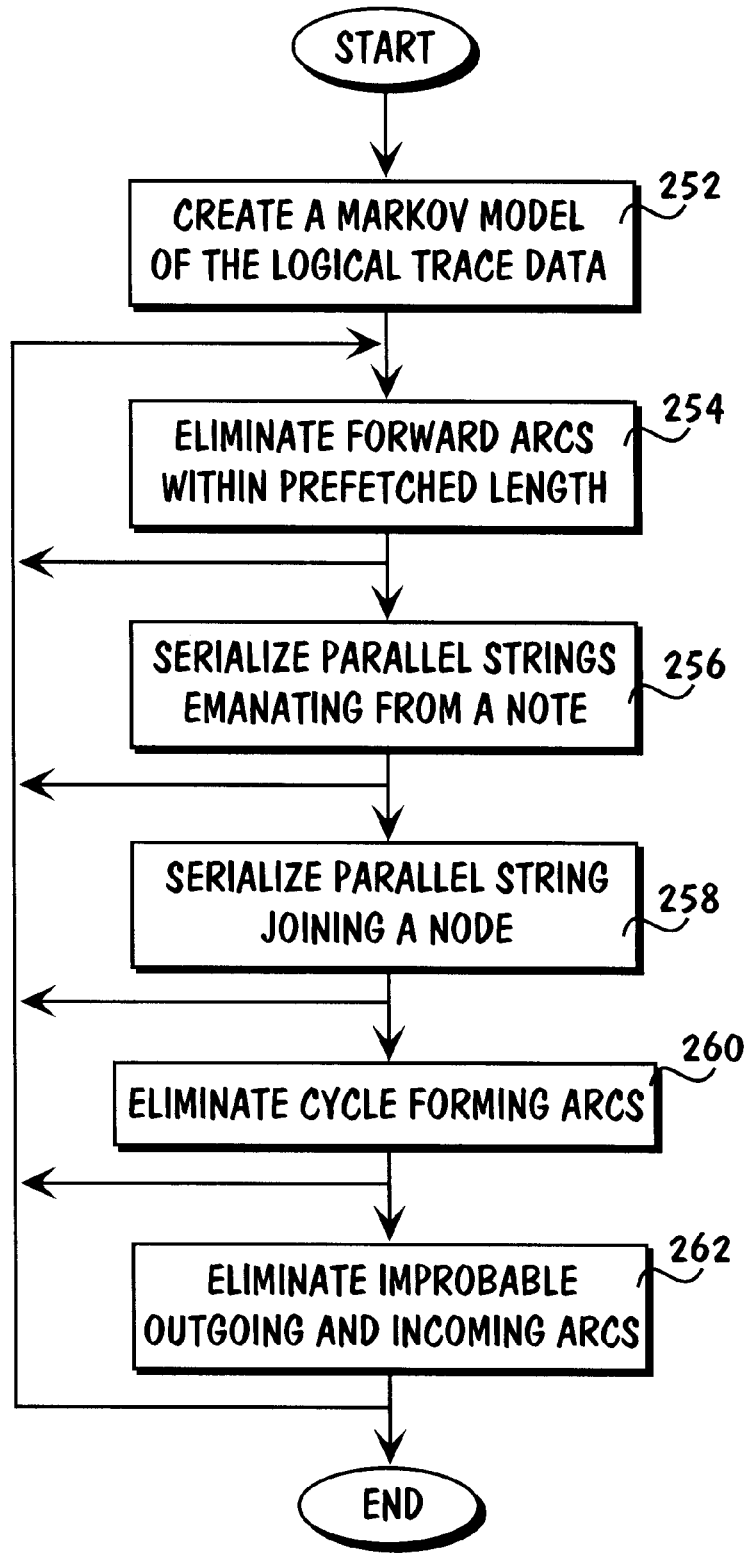
FIG. 16 illustrates yet another alternate embodiment of the operational flow of the reallocation optimizer for reducing a sequence of file accesses, employing a model and a number of model pruning criteria.

FIG. 15 illustrates one embodiment of a computer system suitable for practicing the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, against which video display 218 is coupled. Coupled to standard I/O bus 220 are disk drive 222, removable storage device 223, keyboard and pointing device 224, communication interface 226, and CD/DVD drive 232.

These elements perform their conventional functions known in the art. In particular, disk drive 222 and system memory 214 are used to store a permanent and a working copy of the programming instructions for effectuating the teachings of the present invention, when executed by processor 202. The permanent copy may be pre-loaded into disk drive 222 in factory, loaded from distribution medium 228, or down loaded from a remote distribution source 230. Disk drive 222 and system memory 214 may also be used to store similar copies of operating system 34. The constitutions of these elements are known. Any one of a number of implementations of these elements known in the art may be used to form computer system 200.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, an optimized CD/DVD authoring method and apparatus employing block reallocation have been described.

What is claimed is:

1. A machine implemented method comprising:
    a) creating either a pre-final version of a CD/DVD having a first block allocation or a disk image of the pre-final version of the CD/DVD with the first block allocation;
    b) generating, if possible, an alternate block allocation to the first block allocation that yields improved overall access time for accessing the content of the CD/DVD, based on the order a selected subset or the entire content of the CD/DVD is accessed; and
    c) generating a final version of the CD/DVD using the alternate block allocation.

2. The method as set forth in claim 1, wherein (b) includes generating traces of the selected subset or the entire content of the CD/DVD accessed.

3. The method as set forth in claim 2, wherein (b) includes generating logical file access traces for the selected subset or the entire content of the CD/DVD accessed.

4. The method as set forth in claim 2, wherein (b) includes generating physical block traces for the selected subset or the entire content of the CD/DVD accessed.

5. The method as set forth in claim 1, wherein (b) includes determining the alternate block allocation based on traces of the selected subset or the entire content of the CD/DVD accessed.

6. The method as set forth in claim 5, wherein the traces of (b) are physical block traces of the selected subset or the entire content of the CD/DVD accessed, and the alternate block allocation determination in (b) is performed using the physical block traces.

7. The method as set forth in claim 6, wherein the alternate block allocation determination of (b) is performed employing a model to model the physical blocks accessed, and a number of model pruning criteria to prune the model.

8. The method as set forth in claim 5, wherein the traces of (b) are logical file access traces of the selected subset or the entire content of the CD/DVD accessed, and (b) further includes mapping the logical file accesses to physical blocks for use to determine the alternate block allocation for the CD/DVD.

9. The method as set forth in claim 8, wherein the alternate block allocation determination of (b) is performed employing a model to model the physical blocks accessed, and a number of model pruning criteria to prune the models.

10. The method as set forth in claim 1, wherein (b) includes effectuating the generated alternate block allocation.

11. An apparatus comprising
(a) an execution unit for executing programming instructions; and
(b) a storage medium coupled to the execution unit and having stored therein a plurality of programming instructions to be executed by the execution unit for implementing a CD/DVD authoring tool that operates to create CD/DVD masters with optimized block allocations that yield improved overall access time for CD/DVD data accessed, including a block reallocator that operates to determine the optimized block allocation for each CD/DVD based on the order a selected subset or the entire content of the CD/DVD is accessed.

12. The apparatus as set forth in claim 11, wherein the block reallocator includes a tracer that operates to generate traces of the selected subset or the entire content of the CD/DVD accessed.

13. The apparatus as set forth in claim 12, wherein the tracer operates to generate logical file access traces for the selected subset or the entire content of the CD/DVD accessed.

14. The apparatus as set forth in claim 12, wherein the tracer operates to generate physical block traces for the selected subset or the entire content of the CD/DVD accessed.

15. The apparatus as set forth in claim 11, wherein the block reallocator includes a reallocation optimizer that operates to determine the optimized block allocation based on traces of the selected subset or the entire content of the CD/DVD accessed.

16. The apparatus as set forth in claim 15, wherein the traces are physical block traces of the selected subset or the entire content of the CD/DVD accessed, and the reallocation optimizer determines the optimized block allocation using the physical block traces.

17. The apparatus as set forth in claim 16, wherein the reallocation optimizer further operates to model the physical blocks accessed, and employs a number of model pruning criteria to prune the model to determine the optimized block allocation.

18. The apparatus as set forth in claim 15, wherein the traces are logical file access traces of the selected subset or the entire content of the CD/DVD accessed, and the reallocation optimizer further operates to map the logical file accesses to physical blocks for use to determine the optimized block allocation for the CD/DVD.

19. The apparatus as set forth in claim 18, wherein the reallocation optimizer further operates to map the logical file accesses to physical blocks, and model the physical blocks accessed, and a number of model pruning criteria to prune the models to determine the optimized block allocation.

20. The apparatus as set forth in claim 11, wherein the block reallocator includes a reallocation engine that operates to effectuate the generated optimized block allocations.

21. A machine readable storage medium having stored therein a plurality of programming instructions to be executed by the execution unit for implementing a CD/DVD authoring tool that operates to create CD/DVD masters with optimized block allocations that yield improved overall access time for CD/DVD data accessed, including a block reallocator that operates to determine the optimized block allocation for each CD/DVD master based on the order a selected subset or the entire content of the CD/DVD is accessed.

22. The storage medium as set forth in claim 21, wherein the block reallocator includes a tracer that operates to generate traces of the selected subset or the entire content of the CD/DVD accessed.

23. The storage medium as set forth in claim 22, wherein the tracer operates to generate logical file access traces for the selected subset or the entire content of the CD/DVD accessed.

24. The storage medium as set forth in claim 22, wherein the tracer operates to generate physical block traces for the selected subset or the entire content CD/DVD accessed.

25. The storage medium as set forth in claim 21, wherein the block reallocator includes a reallocation optimizer that operates to determine the optimized block allocation based on traces of the selected subset or the entire content of the CD/DVD accessed.

26. The storage medium as set forth in claim 25, wherein the traces are physical block traces of the selected subset or the entire content of the CD/DVD accessed, and the reallocation optimizer determines the optimized block allocation using the physical block traces.

27. The storage medium as set forth in claim 26, wherein the reallocation optimizer determines the optimized block allocation employing a model to model the physical blocks accessed, and a number of model pruning criteria to prune the model.

28. The storage medium as set forth in claim 25, wherein the traces are logical file access traces of the selected subset or the entire content of the CD/DVD accessed, and the reallocation optimizer further operates to map the logical file accesses to physical blocks for use to determine the optimized block allocation for the CD/DVD.

29. The storage medium as set forth in claim 28, wherein the reallocation optimizer determines the optimized block allocation employing model to model the mapped physical blocks, and a number of model pruning criteria to prune the model.

30. The storage medium as set forth in claim 21, wherein the block reallocator includes a reallocation engine that operates to effectuate the generated optimized block allocations.

* * * * *